Dec. 29, 1970   F. R. PECORARO   3,550,484
FASTENER TOOL
Filed July 26, 1968   3 Sheets-Sheet 2
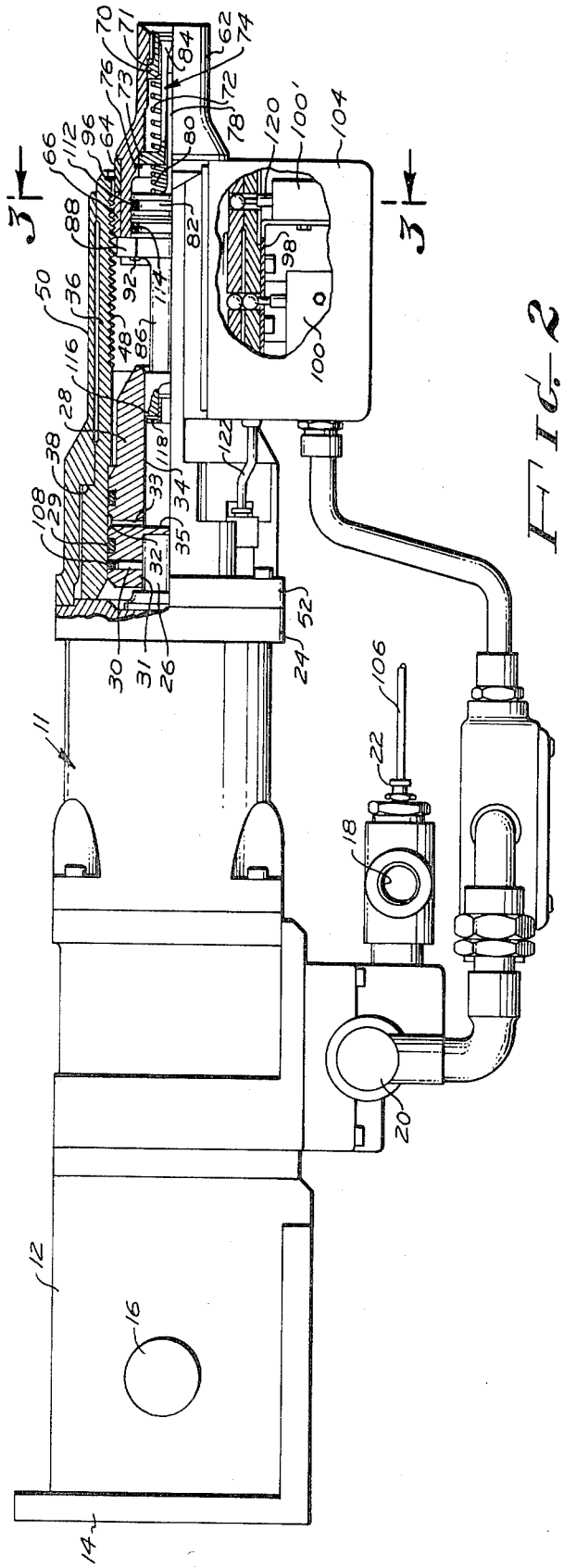
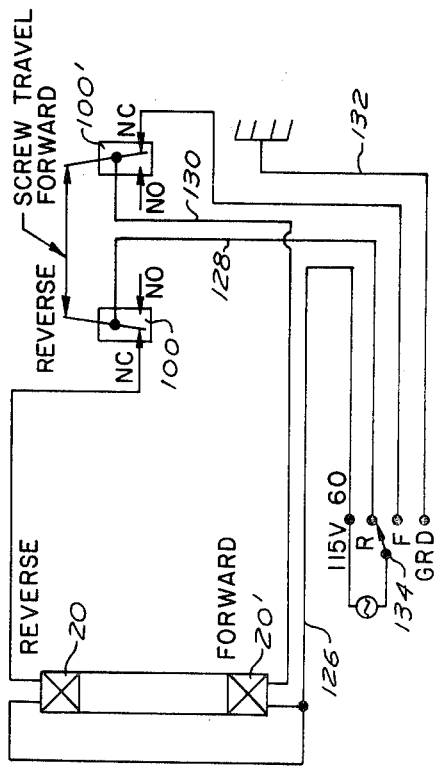
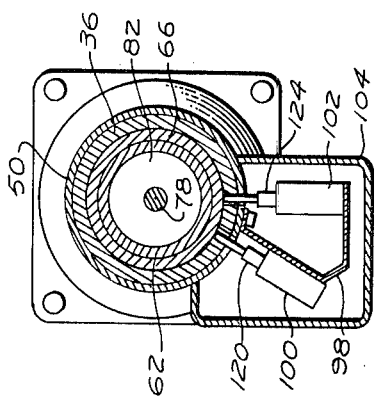
INVENTOR.
FRANCIS R. PECORARO
BY Edward O. Ansell
Taylor M. Belt
ATTORNEYS

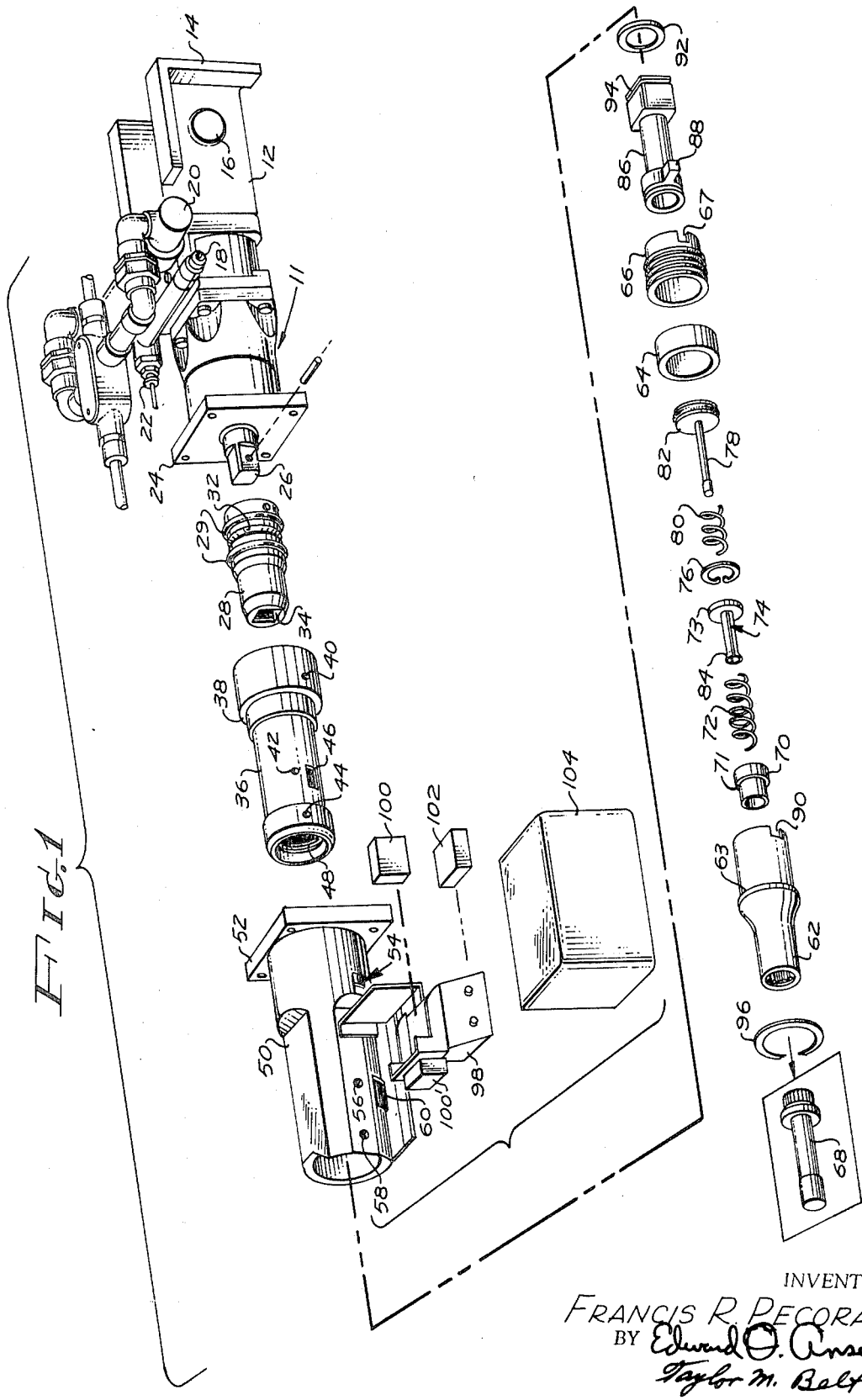

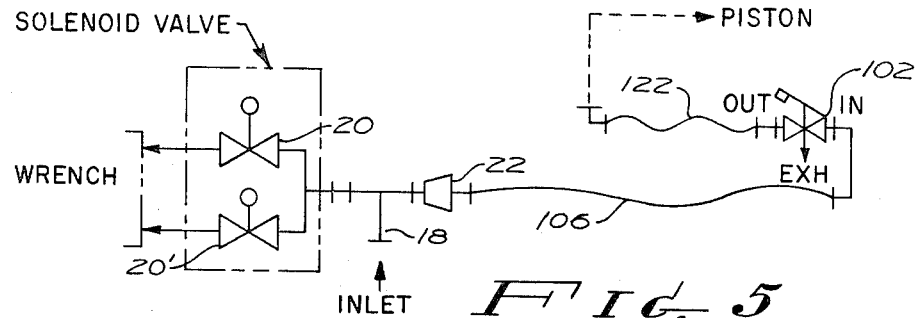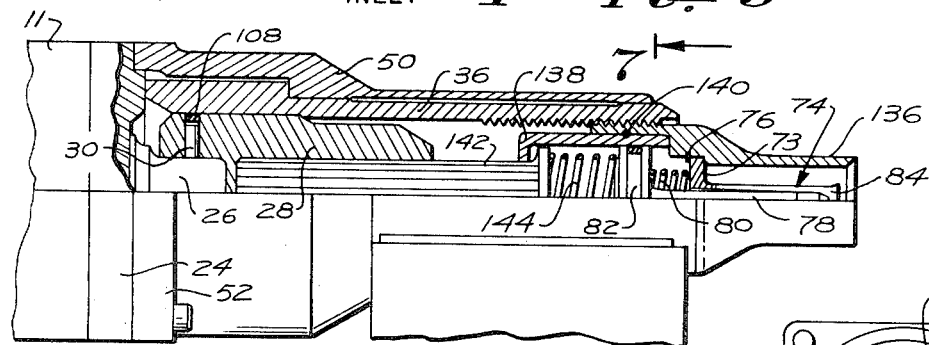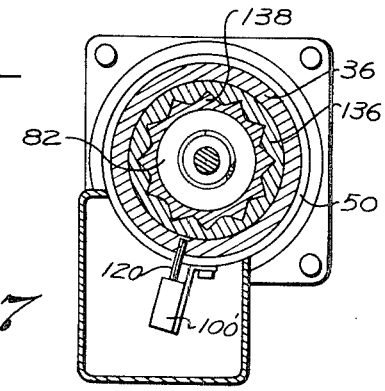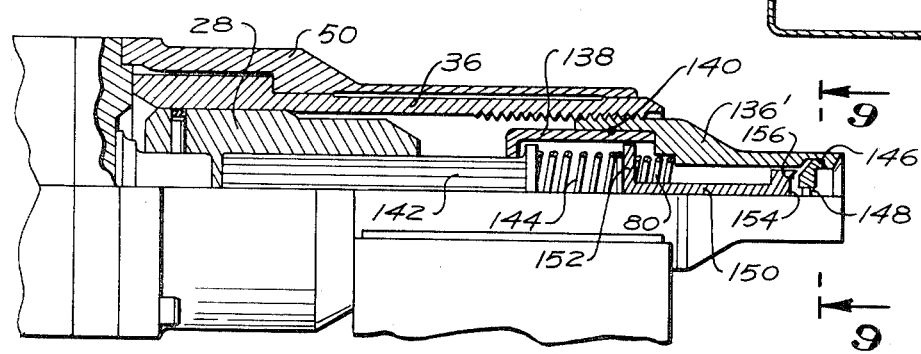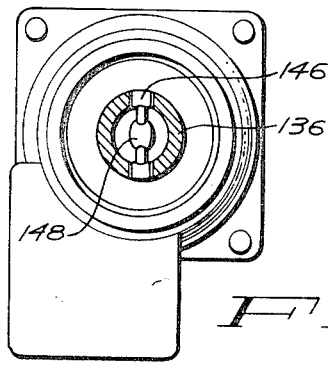

United States Patent Office 3,550,484
Patented Dec. 29, 1970

3,550,484
FASTENER TOOL
Francis R. Pecoraro, Shingle Springs, Calif., assignor to Aerojet-General Corporation, El Monte, Calif., a corporation of Ohio
Filed July 26, 1968, Ser. No. 748,095
Int. Cl. B25b *13/00, 21/02*
U.S. Cl. 81—54                                              11 Claims

ABSTRACT OF THE DISCLOSURE

A fastener tool operated by a rotating power source. The fastener tool comprising an elongated housing having a cylindrical bore therethrough and having a means for mounting the housing on the rotating power source, as for example, an impact wrench. An elongated cylindrical sleeve being internally threaded at one end thereof is mounted within the housing. A driver adapter is rotatably mounted within the sleeve remote from the threaded end thereof and operably engages the driver means of the rotating power source. A fastener socket having external threads thereon screws into the threaded end of the sleeve. A driver extension means is interposed between the driver adapter and the socket and is in operable association therewith for transmitting the rotating force to the socket. A collet and collet actuating means is mounted within the socket whereby the collet engages and holds the fastener during tool operation.

BACKGROUND OF THE INVENTION

The invention described herein was made in the performance of work under a NASA contract and is subject to the provisions of Section 305 of the National Aeronutics and Space Act of 1958, Public Law 85–568 (72 Stat. 435; 42 USC 2457).

This invention relates to a new and useful fastener tool for use in combination with a rotating power source, for example, a powered impact wrench. The fastener tool described herein is utilized similar to a wrench socket and has the additional feature of having a positive gripping action on the fastener being acted upon. This invention is particularly useful in cases where for reasons of safety or convenience it is desirable to dismantle the machinery or equipment by use of a remotely controlled tool.

Prior to this invention, power wrenches were used to perform the final tightening function when inserting bolts or used to loosen bolts to be removed by hand. In some instances sockets were lined with pressure-sensitive adhesive in attempting to make the bolt stick to the socket long enough so that it could either be inserted in the receptical or removed therefrom. In other instances the socket was made with a permanent magnetic material so that a magnetic sensitive fastener could be held in the wrench socket. These methods had limitations in that a magnetic socket had no effect on a non-magnetic fastener. Both the magnetic socket and the pressure-sensitive adhesive-lined socket were limited by the fact that during handling of the bolt care must be taken to prevent any erratic movement or jarring of the bolt or wrench in order to prevent the fastener from dropping out of the socket. There was no known way to obtain a positive grip of the bolt within the wrench socket prior to this invention.

SUMMARY OF THE INVENTION

In the present invention, an impact wrench for other rotating power source is utilized. The only modification to an impact wrench required is a means of mounting the bolt tool to the driver lug end of the wrench. A driver adapter is mounted on the driver lug. A cylindrical sleeve surrounds the driver adapter and allows the driver adapter to rotate therein. One end of the sleeve abuts the impact wrench and the other end of the sleeve extends beyond the driver adapter and has internal threads therein. The sleeve may be attached to the impact wrench or a housing may be utilized to hold the sleeve in position. A socket is screw mounted into the end of the sleeve remote from the driver lug. A collet is mounted within the socket so that the collet extends into the socket and comes into contact with the fastener to be gripped. An internal collet is utilized with a 12-point aircraft bolt, whereas an external collet would be utilized with a cap screw or hex head type of bolt. A driver extension means is connected at one end to the driver adapter, and at the other end to the socket, for transmitting the rotating force of the impact wrench. As the socket screws into the end of the sleeve clearance must be provided so that the socket will not be forced against the driver extension causing the tool to bind. Using the 12-point aircraft bolt as an example, the bolt socket is placed over the head of the aircraft bolt. The internal collet fits into the recess in the bolt head. As the collet is actuated it contacts the bolt head and provides a firm grip thereon. Erratic movement or a slight jarring of the impact wrench will not cause the bolt to be dislodged from the bolt socket.

It is therefore an object of this invention to provide a fastener tool whereby the fastener is firmly held within the socket by a positive gripping action.

Another object of this invention is to provide a fastener tool whereby a fastener will be retained in the socket during remote operation of the fastener tool.

These and other objects of the invention will be apparent from the detailed description which follows, when taken together with the appended drawings.

BRIEF DESCRIPTION OF THE DRAWINGS

FIG. 1 is an exploded view of the invention showing the various parts and their relationship to each other.

FIG. 2 is a cutaway view of the invention showing one preferred embodiment as assembled.

FIG. 3 is a cross-section across 3—3 of FIG. 2 showing the relationship of the limit switches and air actuator valve with the socket.

FIG. 4 is a wiring diagram showing the electrical control circuit for the invention.

FIG. 5 is a pneumatic diagram showing the airflow for the pneumatic embodiment of the invention.

FIG. 6 is a cutaway view of the invention showing a second embodiment having an internal collet for holding a fastener.

FIG. 7 is a cross-section across 7—7 of FIG. 6 showing the drive sleeve in mesh with the socket.

FIG. 8 is a cutaway view of the invention showing a third embodiment having an external collet for holding a fastener.

FIG. 9 is a cross-section across 9—9 of FIG. 8 showing the external collect jaws mounted in the forward end of the socket.

DESCRIPTION OF THE PREFERRED EMBODIMENTS

The present invention concerns a fastener tool. The tool is utilized in combination with a source of rotating power, as for example, an impact wrench. The housing of an impact wrench may be modified to provide a means of attaching the fastener tool thereto.

Reference is now made to the drawings, and in particular, to FIG. 1 which is an exploded view of one embodiment of the present invention. An impact wrench 11 has been modified for mounting onto a remote manipulator arm. A pair of parallel plates 12 are mounted on the back of wrench 11 and extend rearward in relation thereto. Plate flanges 14 extend outwardly from each of the parallel plates 12 and are along the back edge remote from the wrench 11 and along one edge normal thereto. The parallel plates 12 have a hole therein substantially centrally located in order that an elongated manipulator arm pin 16 may be inserted therethrough for mounting the impact wrench 11 onto a remote manipulator arm which is not shown.

The impact wrench 11 has an inlet air fitting 18 mounted thereon for allowing connection with a compressed air line, which air line is not shown. Solenoid valves 20 are contained in the air line intermediate the fitting 18 and wrench 11 for controlling the air input to operate the wrench 11 either for forward operation or for reverse operation. An air takeoff point 22 is connected into the air line intermediate the fitting 18 and valves 20 so that air may be taken off for other uses which will be discussed later.

A mounting flange 24 for mounting the fastener tool onto the wrench 11 is affixed to the housing of the wrench 11 adjacent to the driver lug 26 which protrudes in front of the wrench 11. The mounting flange 24 extends outwardly from the impact wrench 11 and is normal thereto.

A driver adapter 28 is mounted onto the driver lug 26 of the wrench 11. The driver adapter 28 is an elongated cylinder having a shaped bore in both ends thereof. The shaped bores are separated by a partition within the driver adapter 28. The driver adapter 28 is mounted onto the driver lug 26 in a way to prevent the adapter 28 from sliding off the driver lug 26. This may be accomplished by a pin 30 being inserted through the adapter 28 and the driver lug 26. The driver adapter 28 has an external peripheral slot 32 intermediate the ends thereof. The peripheral 32 is in pneumatic communication with the shaped bore 34 which is the bore remote from the driver lug 26. The shaped internal bore 34 may be a square bore, a hex bore, a spline or multiple-point bore, so that rotary force may be transmitted to a shaft inserted therein.

An elongated cylindrical sleeve 36 is mounted over the driver adapter and abuts the wrench 11 adjacent the mounting flange 24. The driver adapter 28 is free to rotate within the sleeve 36. The end of sleeve 36 adjacent to the impact wrench 11 is diametrically enlarged to provide a shoulder 38 intermediate the end of the sleeve 36. There is an air hole 40 through sleeve 36 which air hole 40 is aligned with the adapter peripheral slot 32 to provide pneumatic communication therewith. The sleeve 36 has internal threads within the opening 48 which is at the end of sleeve 36 remote from the impact wrench 11. There are holes 42 and 44 through the sleeve 36 which holes 42 and 44 are in axial alignment and are adjacent to the threaded end of the sleeve 36. The holes 42 and 44 provide opening for limit switches which will be discussed later. There is a slot 46 through the sleeve 36 which slot extends axially along the sleeve 36 and is adjacent to the threaded end of the sleeve. The slot 46 provides an opening utilized in conjunction with an air actuation valve which will be discussed later.

An elongated housing 50 having a cylindrical bore therethrough, has an outwardly extending flange 52 at one end thereof. The flange 52 mates with mounting flange 24 on the impact wrench 11. The cylindrical bore, not shown, which extends through housing 50, is diametrically enlarged at the end adjacent the flange 52 to provide a shoulder to mate with the shoulder 38 on the sleeve 36. The housing 50 encloses the sleeve 36 and holds the sleeve 36 rigidly in position abutting the impact wrench 11. Intermediate the ends of housing 50 adjacent to the flange 52 there is a housing air hole 54 through the housing 50. The housing air hole 54 is in pneumatic communication with the air hole 40 in sleeve 36. Intermediate the ends of housing 50 and remote from the flange 52 there are two housing holes 56 and 58 through the housing 50, which holes 56 and 58 are in axial alignment. The housing holes 56 and 58 are limit switch access holes and align with holes 42 and 44 in the sleeve 36. A housing slot 60 through the housing 50 is intermediate the ends of housing 50 remote from the flange 52. The slot 60 extends axially along the housing and aligns with the slot 46 contained in the sleeve 36. In the embodiment shown in FIG. 1, the housing 50 is mounted onto the impact wrench 11 by the flange 52 being bolted to the flange 24. Alternative means of mounting the housing 50 onto the impact wrench 11 become readily apparent to those versed in the art. A screw-type union joint or a quick discount joint are examples of alternate means of mounting the housing 50 in the impact wrench 11.

An elongated cylindrical fastener socket 62 has one end of a smaller diameter than the other end with a fillet at the point of change in diameter. A ridge 63 intermediate the ends of the fastener socket 62 extends outwardly from the larger diameter portion of the socket 62. A cylindrical spacer collar 64 is mounted on the larger diameter portion of the fastener socket 62 in abutment with the ridge 63. A threaded collar 66 which is a cylindrical member having external threads thereon and radial slots 67 at one end thereof is mounted on the larger diameter portion of the socket 62 adjacent to the spacer collar 64 so that the slots 67 are remote from the collar 64. The bolt 68 is an example of a fastener for which this invention is applicable. The bolt 68 is a 12-point aircraft bolt upon which a rotating force is to be imparted. The fastener socket 62 has a shaped bore (not shown) within the smaller diameter portion, which shaped bore meshes with the head of the bolt 68.

A fastener ejector 70 is a cylindrical thimble-like member having a shoulder 71 intermediate the ends thereof. The ejector 70 is slidably mounted within the fastener socket 62 such that the forward end of the ejector 70 which is the smaller end thereof is substantially even with the forward end of the fastener socket 62. The ejector 70 is biased toward the forward end of the fastener socket 62 by a spring 72. The spring 72 is interposed between the ejector 70 and an internal collet 74. The collet 74 is a circular member or collet head 73 having several prongs 84 extending outwardly from one face of the collet head 73. The prongs 84 are normal to the collet head 73 and are substantially centrally located. The internal collet 74 is mounted within the fastener socket 62 by the use of a snap ring 76 being inserted in a slot within the fastener socket 62. When the collet 74 is mounted in the fastener socket 62 the prongs 84 extend through the spring 72 and the ejector 70 so that the ends of the prongs 84 are substantially even with the forward end of the fastener socket 62. The collet 74 provides a gripping means to frictionally grip the fastener and hold it within the socket 62.

A round piston rod 78 having a circular piston head 82 normal thereto is slidably mounted within the socket 62 and the collet 74. A collet spring 80 is interposed between the piston head 82 and the collet 74 for biasing the piston head 82 away from the collet 74. When forces cause the piston head 82 to override the biasing of the collet spring 80 the piston rod 78 causes the prongs 84 to be expanded. When the collet 74 is in contact with the bolt 68 the prongs 84 are inserted in a depression within the head of the bolt 68. As the prongs 84 are caused to expand they come into direct contact with the bolt 68 and hold the bolt head firmly within the fastener socket 62.

A driver extension shaft 86 having T-lugs 88 extending outwardly therefrom adjacent to one end thereof is mounted onto the fastener socket 62 so that the T-lugs 88 mesh with the socket slots 90 contained in the socket 62 and with the slots 67 contained in the threaded collar 66. The driver extension shaft 86 is held in place on the fastener socket 62 by use of an extension shaft ring 92. The extension shaft ring 92 illustrated is a Spiralox ring.

The other end of the driver extension shaft 86 has a squared end 94. The squared end 94 meshes with the shaped internal bore 34 contained in the driver adapter 28. It is readily apparent that the shaped internal bore 34 may be square, hex, spline, fluted, or multi-pointed, in which instance the other end of the driver extension shaft 86 would have to be of a shape that would mesh with the shaped internal bore 34. After assembling the fastener socket 62 components, the fastener socket 62 is screwed into the sleeve 36, while at the same time the squared end 94 becomes slidably engaged with the driver adapter 28. The fastener socket 62 is held within the sleeve 36 by a socket snap ring 96 which snaps into an internal slot within the sleeve 36 adjacent the forward end thereof.

A bracket 98 has limit switches 100 and 100' mounted thereon. Also mounted on the bracket 98 is a collet air actuator 102. The bracket 98 is mounted on the housing 50 so that the actuation pins on limit switches 100 and 100' extend through the housing holes 56 and 58 and through the sleeve holes 42 and 44, thereby allowing the actuator pins of the limit switches 100 and 100' to be contacted by the threads contained on the threaded collar 66 and the actuator pin on the collet air actuator valve 102 extends through the housing slot 60 and the sleeve slot 46 to also make contact with the threads on the threaded collar 66. The actuator pins on the limit switches 100 and 100' and on the air actuator valve 102 come into contact with the threaded collar 66 as the fastener socket 62 travels axially within the sleeve 36. A cover 104 is mounted on the housing 50 to enclose the bracket 98 and its related components.

The limit switches 100 and 100' are electrically connected to the solenoid valve 20 so that when the socket 62 traverses its limited range of travel the appropriate limit switch 100 or 100' is actuated and thereby causes the solenoid valve 20 to be activated to control the energy input into the impact wrench 11. The collet air actuator valve 102 is operably connected to the air takeoff point 22 and the air inlet hole 54 and 40 contained in the housing and sleeve, respectively, which holes are in operable communication with the piston head 82. When the fastener socket 62 is in its extreme forward position the actuator pin on the collet air actuator 102 is not in contact with the threaded collar 66 so that the valve is in an exhaust position to release any pressure in the line of communication between the collet air actuator 102 and the piston head 82. When the fastener socket 62 moves rearward from its extreme forward position, the actuator pin on the collet air actuator valve 102 comes into contact with the threaded collar 66 and the exhaust port in the air actuator valve 102 is closed, thereby pressurizing the communication line between the collet air actuator valve 102 and the piston head 82. The air pressure acting on the piston head 82 overrides the biasing effect of the collet spring 80.

Reference is now made to FIG. 2 which is a cutaway view of the invention as assembled. The impact wrench 11 which is the rotating power source for imparting a rotating power to the fastener tool is illustrated as it has been modified to provide for a remote manipulator arm attachment. As previously stated, parallel plates 12 are rigidly attached to the impact wrench 11 at the rear end thereof. Plate flanges 14 extend outwardly from the parallel plates 12. A manipulator arm pin 16 extends through and across the parallel plates 12. An input power source of compressed air is connected to the impact wrench 11 at an air inlet 18 which is mounted on the impact wrench 11 and is in operable communication therewith. Solenoid valve 20 is connected in the air lines between the air inlet 18 and the impact wrench 11 for the purpose of controlling the air into the wrench 11, and also controls the direction of drive for the impact wrench 11, either in the forward drive or reverse drive state. An air takeoff point 22 is tapped into the air line and is adjacent the air inlet 18. A collet air line 106 is connected to the air takeoff point 22.

A mounting flange 24 extends outwardly from the impact wrench at the forward end thereof. The driver lug 26 of the impact wrench 11 extends forward of the mounting flange 24. The driver adapter 28 is mounted on the driver lug 26 and is held in place by a pin 30 which extends through the driver lug 26 and into the driver adapter 28. A seal ring 108 which may be an O-ring may be utilized to serve the dual purpose of providing a seal as well as being a means for holding the pin 30 in place. The driver adapter 28 is in operable association with the driver lug 26, which is accomplished by the bore in adapter 28 being of a size and shape to coincide with the driver lug 26. The most common driver lug on impact wrenches is a square lug; however, the driver lug could be hex, fluted, or multi-pointed. The forward end of the driver adapter 28 has a shaped internal bore 34, which bore may be square, hex, fluted or such other shape as may provide for the transmission of a rotational force through the driver adapter 28. The shaped bore 34 extends into the driver adapter 28 to a point just short of being in communication with the driver lug opening 31, there being a partition 35 between the shaped internal bore 34 and the driver lug opening 31. A peripheral slot 32 surrounds the driver adapter 28 which slot is in fluid communication through hole 33 with the shaped internal bore 34. Sealing means are provided on each side of peripheral slot 32 and may be accomplished by the use of seals such as adapter O-rings 29.

The elongated cylindrical sleeve 36 is mounted over the driver adapter 28 and abuts the impact wrench 11. The elongated cylindrical sleeve 36 has a shoulder 38 intermediate the ends thereof. The shoulder 38 is formed by an enlarged diameter of the sleeve 36 at the end adjacent the wrench 11 and the shoulder 38 provides a means for holding the sleeve 36 in place. The housing 50 has a shoulder therein, also formed by a change in diameter in the bore of the housing, and this shoulder is coincident to the shoulder 38 on the sleeve 36. The housing 50 covers the sleeve 36 and is attached to the impact wrench 11. The housing 50 may be attached to the impact wrench 11 by bolting the housing flanged end 52 to the flange 24. When the housing 50 is bolted in place the internal shoulder of housing 50 abuts against the shoulder 38 on sleeve 36 and holds the sleeve 36 firmly in place. The sleeve 36 has internal threads within the opening 48 which threads extend from the forward end of the sleeve 36 to a point approximately midway back into the opening 48.

The fastener socket 62 has the spacer collar 64 and the threaded collar 66 mounted thereon whereby the external threads on the threaded collar 66 engage the internal threads in the sleeve 36. The ejector 70 is mounted within the forward end of the fastener socket 62 so that the shoulder 71 on the ejector 70 abuts against a shoulder within the fastener socket 62. The collet 74 is mounted in the fastener socket 62 so that the prongs 84 extend through the ejector 70 to be able to engage the fastener being acted upon. The collet 74 is held in place by the snap ring 76. A compression spring 72 is intermediate the ejector 70 and the collet 74 for biasing the ejector into the forward position. The piston head 82 with the piston rod 78 thereon is slidably mounted in the fastener socket 62 so that the piston rod 78 extends into the collet 74 to provide a means for expanding the prongs 84 when force is applied to the piston 82. The compression collet spring 80 is intermediate the collet 74 and the piston head 82 and biases the piston head 82 away from the collet 74. A piston O-ring 112 is mounted on the piston head 82 to provide a sealing means between the piston head 82 and the fastener sockets 62.

The driver extension 86 which is an elongated member having outwardly extending T-lugs 88 at one end and the other end being shaped to mesh with the driver adapter 28 is mounted onto the fastener socket 62 and is held in place by extension shaft ring 92. The extension shaft ring 92 may be a snap ring or a spiralox ring. The T-lugs 88 extending outwardly from the driver extension shaft 86 mesh into slots 90 contained in the fastener socket 62. The T-lugs 88 provide a means for imparting a rotating force to the fastener socket 62. The fastener socket 62 is screwed into the forward end of the sleeve 36 and the driver extension shaft 86 is slidable within the driver adapter 28. The driver extension shaft 86 has a central bore through it in order to provide fluid communication between the collet piston head 82 and the shaped internal bore 34 of the driver adapter 28. A sealing means between the driver extension shaft 82 and the fastener socket 62 is provided to prevent air leakage when air pressure is applied against the piston head 82. An example of a sealing means would be the utilization of a shaft O-ring 114 between driver extension shaft 86 and the fastener socket 62. The end of the driver extension shaft 86 which is remote from the fastener socket 62 is a shaped end to mesh with the shaped bore 34 contained in the driver adapter 28. The driver extension shaft 86 is slidable in the driver adapter 28 and meshes with the shaped bore 34 in order to provide a means to impart a rotating force from the driver adapter 28 to the fastener socket 62. A shaft sealing means 116, for example, a fabric washer, is mounted on the driver extension shaft 86 at the end within the driver adapter 28. The sealing means 116 is held in place by a seal retainer 118 attached to the end of the driver extension shaft 86. The shaft sealing means 116 provides an air-tight seal between driver extension shaft 86 and driver adapter 28.

The cover 104 mounted on the housing 50 and encloses control switches for the fastener tool. Forward and rearward limiting switches 100 and 100' are mounted on a bracket 98, which in turn is mounted onto the housing 50. The forward and rearward limiting switches 100 and 100' are electrically connected to the solenoid valve 20 to control the input power for operating the impact wrench 11. The limiting switches are of a similar structure and operate in a similar manner. The switch pin 120 extends from the limit switch 100' through the housing 50 and sleeve 36 by way of hole 58 in the housing 50 and hole 44 in the sleeve 36. The switch pin 120 makes contact with the threaded collar 66. As an alternative and matter of possible convenience a ball may be interposed between the switch pin 120 and the threaded collar 66. The limit switch 100' is positioned so that the switch pin 120 is in a normal closed position maintaining a complete electrical circuit until the pin 120 is forced onto the threads of the threaded collar 66. When the switch pin 120 is forced onto the threads of the threaded collar 66 the switch is forced into an open configuration so that current is cut off, thereby closing the solenoid valve 20 and thereby cutting off power for operating the impact wrench 11 in the forward mode. The rear limit switch 100 is in a normal closed position maintaining a complete electrical circuit, and power from the power source is allowed to actuate the impact wrench 11 in the reverse mode of operation. The wrench 11 may be operated in the reverse mode until the threads on threaded collar 66 force the rear limit switch 100 into an open condition, thereby cutting off power to the wrench 11.

Collet air line 106 is connected to the collet air actuator valve 102 (not shown) mounted within the cover 104. Another air line 122 leads from the collet air actuator valve 102 to connect into the sleeve 36 at the air hole 40 to provide pneumatic communication between the air actuator valve 102 and the piston head 82.

Referring now to FIG. 3, there is a shown a cross-section view of the tool across section 3—3 of FIG. 2. Within the cover 104 there is mounted a bracket 98, which bracket 98 is mounted on the housing 50. The limit switches 100 and 100' are in alignment so that limit switch 100 is the only one visible in this figure. The limit switches 100 and 100' are mounted on the bracket 98 so that the switch pin 120 extends through the housing 50 and the sleeve 36. In addition to the limit switches 100 and 100' there is mounted on the bracket 98 the collet air actuator relationship to the fastener socket 62. A valve pin 124 is connected to the valve 102 and extends through the valve 102. The valve 102 is mounted so that it is in radial housing 50 and the sleeve 36 so that it may come into contact with the threaded collar 66. When the bolt socket 62 is in the extreme forward position, the valve pin 124 does not contact the threads on the threaded collar 66 and the valve 102 is in a normal exhaust condition. When the fastener socket 62 is retracted into the sleeve 36 the threads on threaded collar 66 contact the valve pin 124 forcing the valve pin to ride upon the threads of the threaded collar 66 and closes the exhaust port of the valve 102. As the valve 102 is in a closed condition, the air from the air takeoff point 22 shown in FIG. 2 is allowed to flow into the bolt tool and pressurizes against the piston head 82, also shown in FIG. 2, thereby forcing the piston head 82 and the piston rod 78 forward to that the piston rod 82 causes the prongs 84 to expand and grip the head of a fastener being acted upon.

FIG. 4 illustrates the wiring diagram for the present invention. An electrical power source is connected to the electrical power line 126. The electrical power line 126 is connected to one side of the solenoid valves 20 and 20'. The control circuit is completed from the solenoid valves 20 and 20' through the switches 100 and 100' by lines 128 and 130, for reverse or forward control, respectively. A control switch 134 operated by an operator of the wrench 11 completes the circuit for either reverse or forward operation. An electrical ground is provided through ground line 132 for safety purposes.

FIG. 5 is a pneumatic diagram for the present invention when using compressed air as a power source. The power source is connected to the impact wrench at the air inlet point 18. The air for operating impact wrench 11 is connected into the wrench through the solenoid valves 20 and 20'. Air for operating the piston head 82 is taken off at the air takeoff point 22 and is controlled by the collet air actuator valve 10, which is connected to the air takeoff point 22 by air line 106. The collet air actuator valve 102 is either in an exhaust condition or is in a closed configuration o provide pneumatic communication with the piston head 82 through the air line 122.

The fastener tool may be operated for either removing a bolt during dismantling or inserting a bolt during a fabrication operation. In operation the fastener socket 62 is in a full forward or fully extended position. The fastener socket 62 is placed on the fastener head, for example, a 12-point aircraft bolt, so that the fastener socket 62 is in operable association therewith. The fastener ejector 70 has been forced away from the opening in the fastener socket 62, and the prongs 84 are within a cavity in the fastener head.

The impact wrench 11 is then placed into the reverse mode which imparts a rotating force on the fastener through the fastener socket 62. The fastener socket 62 being screwed into the sleeve 36 is retracted into the sleeve and the driver shaft 86 is forced to slide into the driver adapter 28. As the threads on the threaded collar 66 come into contact with the valve pin 124 the collet air actuator valve 102 changes from an exhaust position to a closed position which causes air pressure to be asserted against the piston head 82. The piston head 82 is forced forward forcing the piston rod 78 forward to cause the prongs 84 to be expanded against the fastener head and provide afirm frictional grip onto the fastener being acted upon. The impact wrench 11 continues to operate in the reverse limit switch 100. When the reverse limit switch 100 is forced into the open condition, the reverse solenoid valve 20 is actuated, cutting off power to the impact wrench 11. The fastener socket 62 has been retracted into the sleeve 36 and the fastener is firmly held within the fastener socket 62. In the dismantling operation the fastener is free from its receptacle so that the fastener may be removed and disposed of. The fastener is disposed of by operating the wrench 11 in a forward mode until the fastener socket 62 reaches the forward limit of travel. At the forward limit of travel the threaded collar 66 comes into contact with the forward limit switch 100' so that solenoid valve 20 cuts off power to the wrench 11 and prevents further forward operation. The valve pin 124 on the collet air actuator valve 102 loses contact with the threads on the threaded collar 66 and the valve 102 changes to an exhaust position. Air pressure against the piston head 82 is released so that the collet spring 80 forces the piston head away from the collet 74. The piston rod 78 is forced rearward and allows the prongs 84 to spring together losing contact with the fastener head. The ejector spring 72 forces the fastener ejector 790 forward causing the fastener to be dislodged from the fastener socket 62.

In the fabrication process the fastener is placed in the fastener socket 62 and retracted into the sleeve 36 in a manner similar to that performed during the dismantling operation. As the fastener is gripped within the fastener tool it may now be placed in a position for insertion into a receptacle for being screwed therein. The impact wrench 11 is placed into a forward mode by operation of control switch 134. The impact 11 imparts a rotating force to the fastener socket 62 causing the fastener socket 62 to be screwed forward within the sleeve 36. As the socket 62 is screwed forward, the threads on the threaded collar 66 clear the valve pin 124, thereby placing the air actuator valve 102 in an exhaust configuration. As the air pressure is relieved from the piston head 82 the collet spring 80 forces the piston 82 rearward and allows the prongs 84 to spring away from contact with the fastener head. The threads on the threaded collar 66 come into contact with the forward limit switch 100' and the switch 100' is forced into an open position which in turn activates the forward solenoid valve 20' cutting off power to the impact wrench 11. The fastener socket 62 may now be easily removed from the fastener head. It is readily apparent that as long as the fastener socket 62 is positioned within the sleeve 36 so that the threads on the threaded collar 66 are not in contact with either the reverse limit switch 100 or the forward limit switch 100', the impact wrench 11 may be operated in either the forward or reverse mode.

Another embodiment of the present invention is shown in FIG. 6. A thread fastener socket 136 having external threads on the larger diameter portion of the socket 136 is similar to the fastener socket 62 of the first embodiment, with the exception that the external threads are formed on the fastener socket 136, thereby eliminating the need for the spacer collar 64 and the threaded collar 66, utilized in the first embodiment. As in the previous embodiment, the collet head 73 having prongs 84 extending therefrom is mounted within the fastener socket 136 so that the prongs are adjacent the forward end of the socket 136. The collet head 73 is held in place by the snap ring 76. The fastener socket 136 is mounted on a drive sleeve 138 and meshes therewith so that the rotating force may be imparted to the fastener socket 136 through the drive sleeve 138. The drive sleeve 138 is an elongated tubular member having inwardly extending flanges at one end thereof and the other end having a shaped external surface to mesh with the fastener socket 136. The drive sleeve 138 is held into the fastener socket 136 by a keeper pin 140. The piston head 82 having a piston rod 78 extending therefrom is slidably mounted within the drive sleeve 138 with the piston rod 78 extending through the collet head 73 into the prongs 84. The collet spring 80 is interposed between the collet head 73 and the piston head 82 away from the collet head 73. A driver extension shaft 142 which is an elongated member having an outwardly extending flange at one end thereof and a shaped external surface so that rotating forces may be transmitted is mounted through the flanged end of the driver sleeve 138. The opening of the flanged end of the driver sleeve 138 is shaped to mesh with the surface of the driver extension shaft 142 so that rotating forces may be transmitted. A compression spring 144 is interposed between the piston head 82 and the driver extension shaft 142. The driver extension shaft 142 is mounted into the forward opening of the driver adapter 28 and is in operable association therewith for transmitting a rotating force from the driver adapter 28 to the fastener socket 136. Forward and reverse limit switches are provided on this embodiment identical to that described for the embodiment set forth in FIG. 2. The wiring diagram shown in FIG. 4 is applicable to this embodiment.

FIG. 7 is a cross-section through 7—7 of FIG. 6 to shown the relationship between the driver sleeve 138 and the bolt socket 136. The driver sleeve 138 has an external surface with 12 points and meshes into the bolt socket 136 which has a 12-pointed internal surface. The driver sleeve 138 meshing with the fastener socket 136 in a nonslidable relationship provides a means for transmitting rotating forces to the socket 136.

In operation this embodiment operates very similar to the first embodiment with the exception of the means for activating the piston head 82. When the fastener socket 136 is in the extreme forward position the piston head 82 is biased away from the collet head 74 so that the prongs 84 are relaxed. As the fastener socket 136 is retracted into the sleeve 36 the driver sleeve 138 slides along the driver extension shaft 142. The fastener socket 136 being retracted into the sleeve 36 causes the compression spring 144 to be compressed and overrides the collet spring 80, thereby forcing the piston rod 78 to be driven forward between the prongs 84 and expands the prongs 84 to provide a firm grip upon the fastener. So long as the fastener socket 136 is in the retracted position the fastener is firmly grasped within the fastener socket 136. When impact wrench 11 is placed in the forward mode the fastener socket 136 is screwed forward in the sleeve 36 and this releases the compression on the compression spring 144. When the fastener socket 136 is in the full forward position the compression spring 144 is completely relaxed and the collet spring 80 biases the piston head 82 away from the collet head 74. As the piston head 82 is biased away from the collet head 74 the piston rod 78 is retracted from the prongs 84. The prongs 84 are allowed to relax and the fastener being acted upon is no longer held into the fastener socket 136.

A third embodiment of the invention is shown in FIGS. 8 and 9. This third embodiment is very similar to the second embodiment above described, with the exception that the gripping means is an external collet rather than an internal collet. At least two collet jaws 146 are slidably mounted in the fastener socket 136' adjacent to the forward end thereof. Each collet jaw 146 is a right angular member having an incline plane across the external corner thereof. A collet expander spring 150 is interposed between the collet jaws 146 to bias the collet jaws 146 away from each other. A spool 150 having a piston head 152 is slidably mounted within the fastener socket 136' and the driver sleeve 138. The other end of the spool 150 adjacent the collet jaws 146 has a cavity 154 with a slanting wall 156 around the circumference. The slanting wall 156 on the spool 150 is forced to slide along the inclined plane on the jaws 146 and thereby cause the jaws to close and grip the fastener. A collet spring 80 is interposed between the fastener socket 136' and the piston head 152 to bias the spool 150 away from the collet jaws 146. The means for actuating the piston head 152, for imparting a rotating force to the fastener socket 136', and for controlling the fastener tool are the same for this embodiment as for the second embodiment above described.

FIG. 9 is a sectional view across section 9—9 of FIG. 8. This sectional FIG. 9 illustrates the collet jaws 146 being slidably mounted in slots contained in the forward end of the fastener socket 136'. The collet expander spring 148 is interposed between the collet jaws 146 to force the jaws 146 away from each other.

This third embodiment operates in substantially the same manner as the second embodiment of this invention. Initially, the fastener socket 136' would be in a full forward position. When the socket 136' is in the full forward position the compression spring 144 is fully relaxed and the collet spring 80 biases the spool 150 away from the collet 146. The collet expander spring 148 biases the collet jaws into an open position. The fastener socket 136' is placed upon a fastener and the impact wrench 11 is placed in the reverse mode. The fastener socket 136' is forced to be screwed into the elongated sleeve 36 and the driver sleeve 138 slides along the driver extension shaft 142. As the socket 136' is retracted the compression spring 144 is compressed, which overrides the biasing effect of the collet spring 80 and forces the spool 150 forward into the fastener socket 136'. The spool 150 reacts on the collet jaws 146 on an incline plane principle, forcing the collet jaws 146 into a smaller diameter and thereby grasps the fastener. The fastener is then rigidly held into the fastener socket 136' during retraction of the fastener socket 136' into the elongated sleeve 36. When the impact wrench 11 is placed in the forward mode the fastener socket 136' is screwed forward in the elongated sleeve 36. As the fastener socket 136' approaches the full forward position the compression on the compression spring 144 is relaxed so that the collet spring 80 biases the spool 150 away from the collet jaws 146. The collet expander spring 148 in turn biases the collet jaws 146 into an open position, thereby relaxing the grasp of the collet jaws 146 on the fastener. In the full forward position the collet jaws 146 are biased into a full open position and the fastener is no longer held into the fastener socket 136'.

While preferred embodiments of the present invention are described herein, the descriptions are only for illustrative purposes and it will become apparent to those skilled in the art that modifications and variations can be made without departing from the principles and spirit of the invention, the scope of which is defined in the appended claims.

What is claimed is:

1. A fastener tool driven by a source or rotating power wherein a rotating force is imparted to a fastener element, such as bolts, nuts, and the like, through a driver lug, said tool comprising:
   a driver adapter to be mounted on the driver lug and in operable relation therewith;
   an elongated cylindrical sleeve, said sleeve being slidably mounted over said adapter so that said adapter may rotate therein, one end of said sleeve extending beyond said adapter;
   a socket member having a receptacle end thereon for receiving the fastener element;
   means mounting said socket member within said sleeve for relative rotation and axial movement therebetween at the end remote from the driver lug so that said socket member is movable between extended and retracted positions with respect to said sleeve;
   means mounted within the receptacle end of said socket member for gripping the fastener element during tool operation, said gripping means being movable between a first non-gripping position and a second operative position in which said gripping means frictionally secures the fastener element thereto;
   means operably associated with said gripping means and actuatable to move said gripping means to its operative position; and
   a driver extension means interposed between said adapter and said socket member, and in operable association therewith, for transmitting the rotating force to said socket member; whereby the socket member may retain the fastener element as the socket member is moved to its retracted position when said gripping means is in its operative position.

2. The fastener tool as described in claim 1, further including an elongated cylindrical housing mounted on and substantially covering said sleeve.

3. The fastener tool as described in claim 1, further including:
   an energy source connected to the source of rotating power;
   a control means interposed between the source of rotating power and the energy source for controlling the energy input into the source of rotating power; and
   a switching means in operable association with said socket and operably connected to said control means for changing modes of the control means when the socket has reached predetermined points of travel within said sleeve.

4. The fastener tool as described in claim 1 wherein said gripping means includes:
   a collet head having elongated prongs thereon and normal thereto, said collet head being mounted in said socket so that said prongs extend substantially through said socket and terminate adjacent said receptacle end; and wherein said actuatable means for moving said prongs to their operative position comprises:
   a piston head having an elongated rod thereon and normal thereto, said piston head being slidably mounted in said socket so that said rod is slidable between said prongs in response to forces applied to said piston head; and
   means interposed between said collet head and said piston head for biasing said piston head away from said collet head until said biasing means is overcome by opposing forces applied to said piston head.

5. The fastener tool as described in claim 1 wherein said gripping means includes:
   at least two jaws slidably mounted within said socket adjacent to said receptacle end, said jaws being right angular shaped and having an inclined planar surface remote from said receptacle end; and wherein said actuatable means for moving said jaws to their operative position comprises:
   a spool slidably mounted in said socket member, said spool having two diametrically enlarged ends thereon, one end in operable association with said jaws;
   means interposed between the other end of said spool and said driver extension means for applying forces to said spool to bias said spool toward the receptacle end of said socket as said socket is retracted into said sleeve;
   means interposed between the other end of said spool and said socket member for biasing said spool away from said jaws until said biasing means is overcome by the opposing forces applied to said spool;
   means interposed between said jaws for biasing said jaws away from each other to the first non-gripping position; and
   means on said one end of said spool seated against the respective inclined planar surfaces of said jaws and being operable to force jaws radially inward into the operative position gripping the fastener element.

6. The fastener tool as described in claim 1 wherein said socket member has at least two radial slots therein at the end remote from the receptacle end in which the fastener element is received; and wherein said driver extension means includes:
   an extension shaft having at least two outwardly extending lugs on one end, said lugs being received by said radial slots, and the other end of said extension shaft being slidably mounted in said driver adapter.

7. The fastener tool as described in claim 1 wherein said socket member has a non-cylindrical bore therein at the end remote from the receptacle end in which the fastener element is received; and wherein said driver extension means includes:
- a driver sleeve having a non-cylindrical outer surface inmeshing relation with said non-cylindrical bore of said socket, said driver sleeve having a cylindrical bore substantially therethrough with an inwardly extending flange at one end thereof, said flange providing a non-cylindrical reduced opening in said one end, and said sleeve being mounted into said socket so that the reduced opening is remote from said socket;
- a driver extension shaft having a non-cylindrical surface, one end of said shaft having an outwardly extending flange, said shaft being slidably mounted through said reduced opening of said sleeve and in rotating operable association therewith, so that said shaft flange is slidable within said driver sleeve and the other end of said shaft is mounted into said driver adapter; and
- a biasing means interposed between said gripping means and said shaft flange for biasing said shaft into said adapter and for activating said gripping means.

8. The fastener tool as described in claim 3 wherein said switching means includes:
- a pair of microswitches mounted on said housing and spacially separated along the line of linear travel of said socket, said microswitches being in operable association with said socket and operably connected to said control means.

9. The fastener tool as described in claim 3 wherein said control means includes a solenoid valve interposed between the energy source and the source of rotating power.

10. The fastener tool as described in claim 3 wherein said control means includes a solenoid switch interposed between the energy source and the source of rotating power.

11. The fastener tool as described in claim 3 in which the energy source is air under pressure, and wherein said gripping means further includes:
- an air control valve between said energy source and said piston head, said valve being mounted on said housing and in operable association with said socket, and said valve being in fluid communication with said piston head and said energy source.

References Cited
UNITED STATES PATENTS

| | | | |
|---|---|---|---|
| 3,162,072 | 12/1964 | Stewart | 81—55 |
| 2,993,397 | 7/1961 | Albertson et al. | 81—125 |
| 3,379,231 | 4/1968 | Gallo | 81—125X |
| 3,244,208 | 4/1966 | McKenzie | 81—125X |

JAMES L. JONES, Jr., Primary Examiner

U.S. Cl. X.R.

81—55, 125; 144—32; 145—52